(12) United States Patent
Aoki et al.

(10) Patent No.: US 7,602,366 B2
(45) Date of Patent: Oct. 13, 2009

(54) LIQUID CRYSTAL DISPLAY DEVICE

(75) Inventors: Yoshinori Aoki, Mobara (JP); Mitsuru Goto, Chiba (JP); Kenichi Akiyama, Mobara (JP)

(73) Assignee: Hitachi Displays, Ltd., Chiba (JP)

( * ) Notice: Subject to any disclaimer, the term of this patent is extended or adjusted under 35 U.S.C. 154(b) by 495 days.

(21) Appl. No.: 11/006,642

(22) Filed: Dec. 8, 2004

(65) Prior Publication Data

US 2005/0146494 A1    Jul. 7, 2005

(30) Foreign Application Priority Data

Dec. 8, 2003    (JP)    ............... 2003-408359

(51) Int. Cl.
G09G 3/36    (2006.01)

(52) U.S. Cl. ............... 345/99; 345/87; 345/90; 345/93; 345/95; 345/98; 345/100

(58) Field of Classification Search ........... 345/84–104, 345/204–215, 690–699
See application file for complete search history.

(56) References Cited

U.S. PATENT DOCUMENTS

| | | | |
|---|---|---|---|
| 5,657,034 A | | 8/1997 | Yamazaki |
| 5,670,970 A | * | 9/1997 | Yamazaki ............ 345/8 |
| 5,748,171 A | * | 5/1998 | Ishizaki et al. ............ 345/101 |
| 6,172,661 B1 | * | 1/2001 | Imajo et al. ............ 345/89 |
| 6,825,826 B1 | * | 11/2004 | Mikami et al. ............ 345/98 |
| 2003/0053321 A1 | * | 3/2003 | Ishiyama ............ 363/59 |
| 2003/0063041 A1 | | 4/2003 | Kurashima et al. |
| 2003/0210215 A1 | * | 11/2003 | Takahashi ............ 345/87 |
| 2004/0140947 A1 | * | 7/2004 | Tsuyuki et al. ............ 345/1.1 |
| 2004/0155848 A1 | * | 8/2004 | Kudo et al. ............ 345/89 |
| 2005/0001798 A1 | * | 1/2005 | Nohtomi et al. ............ 345/87 |

* cited by examiner

Primary Examiner—Vijay Shankar
(74) Attorney, Agent, or Firm—Antonelli, Terry, Stout & Kraus, LLP.

(57) ABSTRACT

An optimum driving method is realized in a miniaturized liquid crystal display device having two liquid crystal display panels so as to low power consumption. The liquid crystal display device includes a first liquid crystal display panel, a second liquid crystal display panel, a drive circuit which is mounted on the first liquid crystal display panel, output terminals which are formed on the first liquid crystal display panel and to which signals outputted from the drive circuit are supplied, and connection lines which connect the output terminals and the second liquid crystal display panel, wherein the drive circuit can change the AC driving method employed during a display period of the first liquid crystal display panel and the AC driving method employed during a display period of the second liquid crystal display panel which are present within the same frame.

5 Claims, 11 Drawing Sheets

FIG. 5
| D15 | D14 | D13 | D12 | D11 | D10 | D9 | D8 | D7 | D6 | D5 | D4 | D3 | D2 | D1 | D0 |
|---|---|---|---|---|---|---|---|---|---|---|---|---|---|---|---|
| 0 | 0 | 0 | * | * | * | * | * | * | * | * | * | * | * | * | * |
| 0 | 0 | 1 |   |   |   |   |   |   |   |   |   |   |   |   |   |
|   | ⋮ |   |   |   |   |   |   |   |   |   |   |   |   |   |   |
| 1 | 1 | 1 |   |   |   |   |   |   |   |   |   |   |   |   |   |
ID
FIG. 6
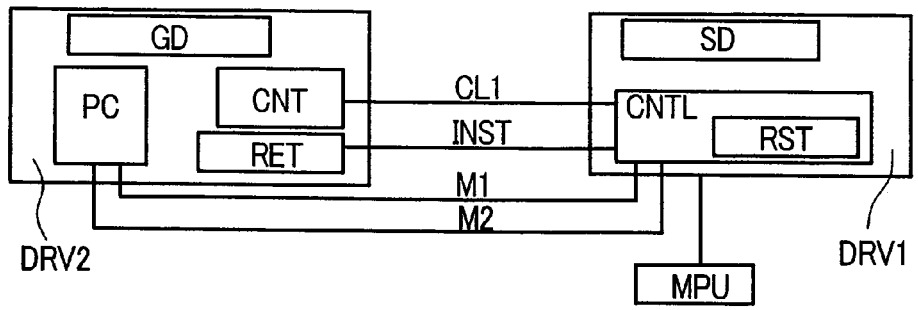
FIG. 7
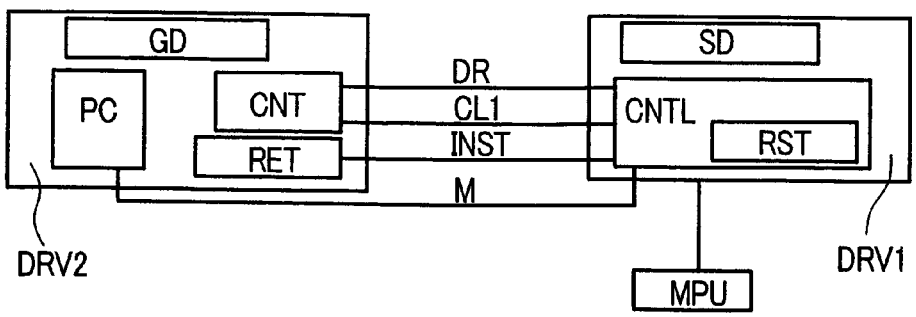

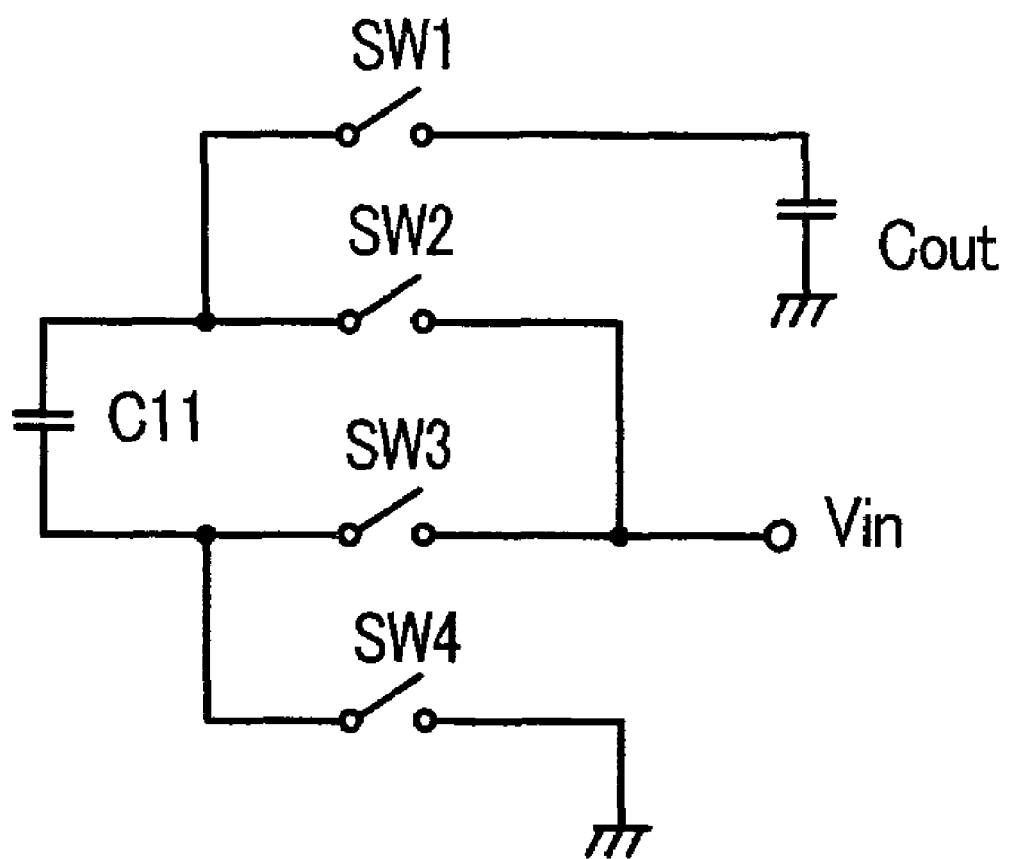

LIQUID CRYSTAL DISPLAY DEVICE

BACKGROUND OF THE INVENTION

The present invention relates in general to a liquid crystal display device, and, more particularly, the invention relates to a technique which is effective when applied to a drive circuit of a liquid crystal display device having two liquid crystal display panels, which is used in a mobile phone or the like.

A liquid crystal display module adopting a TFT (Thin Film Transistor) method, which has a miniaturized liquid crystal display panel for color display having a sub pixel number of approximately 100×150×3, or an organic EL display device having an organic EL element, has been popularly used as a display part of a PDA (Personal Digital Assist), a mobile phone and the like. Further, recently, a foldable mobile phone which includes a main display part and a sub display part has been available.

As such a liquid crystal display module for a mobile phone, which includes a main display part and a sub display part, there is a known integral-type liquid crystal display module which includes a first liquid crystal display panel corresponding to the main display part and a second liquid crystal display panel corresponding to the sub display part (see Japanese Unexamined Patent Publication 2002-220606 hereinafter referred to as patent document 1).

In the integral type liquid crystal display module which is described in the above-mentioned patent document 1, the first liquid crystal display panel and the second liquid crystal display panel are connected with each other using connection lines formed on a flexible printed circuit board, and, at the same time, the first and second liquid crystal display panels are driven by one liquid crystal drive circuit.

Due to such a constitution, it is possible to reduce the number of mounting parts, and, hence, the manufacturing cost can be reduced, and, at the same time, space saving can be realized.

SUMMARY OF THE INVENTION

In the liquid crystal display module described in the above-mentioned patent document 1, assuming that the number of display lines of the main display part is s "m" and the number of display lines of the sub display part is "n", the liquid crystal display module is driven as a single screen having pseudo (m+n) display lines; and, hence, it is impossible to adopt driving methods which are optimum to the main display part and the sub display part, respectively, whereby a reduction of the power consumption is hampered.

The present invention has been made to overcome the above-mentioned drawback, and it is an object of the present invention to provide a technique which can ensure a low power consumption by realizing an optimum driving method in a miniaturized liquid crystal display device having two liquid crystal display panels.

The above-mentioned and other objects and novel features of the present invention will become more apparent from the following description in this specification and the attached drawings.

A summary of representative aspects of the invention disclosed in this specification is as follows.

That is, the present invention is directed to a liquid crystal display device which includes a first liquid crystal display panel; a second liquid crystal display panel; a drive circuit which is mounted on the first liquid crystal display panel; output terminals which are mounted on the first liquid crystal display panel and to which signals outputted from the drive circuit are supplied; and connection lines which connect the output terminals and the second liquid crystal display panel. In this liquid crystal display device, the drive circuit is capable of changing the AC driving method employed during a display period of the first liquid crystal display panel and the AC driving method employed during a display period of the second liquid crystal display panel, which are present within the same frame.

Further, the present invention is also characterized in that the alternating of the first common voltage is stopped during a non-display period of the first liquid crystal display panel, and the alternating of the second common voltage is stopped during a non-display period of the second liquid crystal display panel.

Further, the present invention is also characterized in that the drive circuit includes a booster circuit part and the booster circuit part is capable of changing the operational mode thereof in response to an external signal.

Still further, the present invention is also characterized in that the drive circuit includes a gray scale voltage generating part, and the drive circuit stops the operation of unnecessary amplifying circuits in the inside of the gray scale voltage generating part during a non-display period of the first liquid crystal display panel or the second liquid crystal display panel.

A brief explanation of an advantageous effect obtained by the present invention described in this specification is as follows. That is, according to the liquid crystal display device of the present invention, a low power consumption can be realized.

BRIEF DESCRIPTION OF THE DRAWINGS

FIG. 5 is a table showing instruction signals used in the liquid crystal display module of the embodiment 1 of the present invention;

FIG. 6 is a diagram showing signals transferred from a first drive circuit to a second drive circuit when the drive circuit is divided in two in the liquid crystal display module of the embodiment 1 of the present invention;

FIG. 7 is a diagram showing signals transferred from a first drive circuit to a second drive circuit when the drive circuit is divided in two in the liquid crystal display module of the embodiment 1 of the present invention;

FIG. 15 is a schematic circuit diagram showing the more specific constitution of the booster circuit shown in FIGS. 14A to 14C.

DETAILED DESCRIPTION OF THE INVENTION

Hereinafter, various embodiments of the present invention will be explained in conjunction with the drawings.

Here, in all of the drawings, parts having identical functions are identified by the same symbols, and a repeated explanation thereof is omitted.

Embodiment 1

Figure 1:
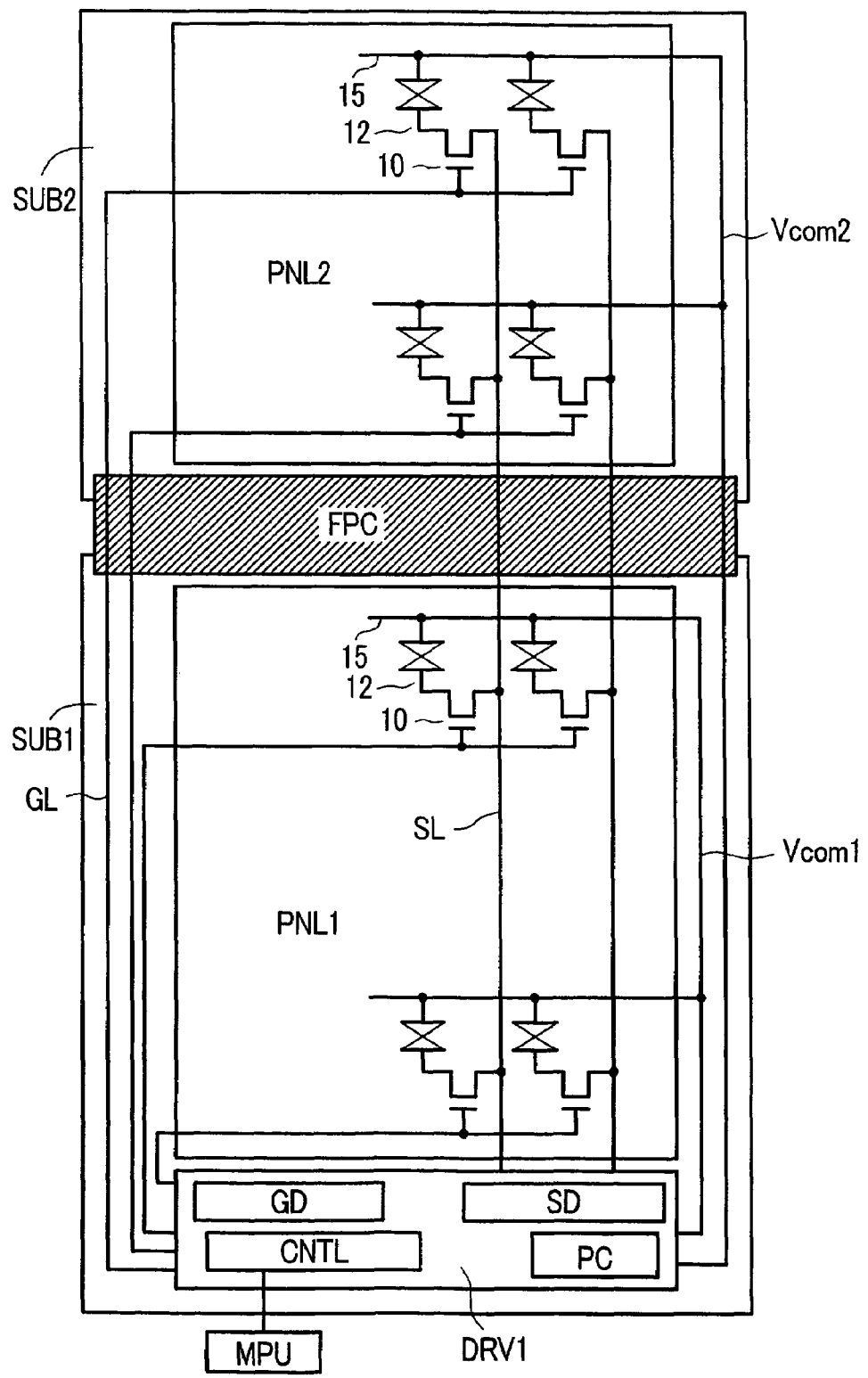
FIG. 1 is a schematic diagram showing the constitution of a liquid crystal display module representing an embodiment 1 of the present invention.

FIG. 1 is a schematic diagram showing the constitution of a liquid crystal display module representing this embodiment 1. The liquid crystal display module of this embodiment is an integral type liquid crystal display module, which includes a first liquid crystal display panel and a second liquid crystal display panel.

In FIG. 1, PNL1 indicates the first liquid crystal display panel, which constitutes a main display part when a foldable mobile phone is used in an opened state, while PNL2 indicates the second liquid crystal display panel, which constitutes a sub display part when a foldable mobile phone is used in a closed state.

On the first liquid crystal display panel PNL1 and the second liquid crystal display panel PNL2, a plurality of scanning lines (or gate lines) GL and a plurality of video lines (or drain lines) SL are respectively arranged in parallel. Pixel portions are formed at portions where the scanning lines GL and the video lines SL intersect each other. A plurality of pixel portions are arranged in a matrix array, and each pixel portion is provided with a pixel electrode 12 and a thin film transistor 10.

The first and second liquid crystal display panels PNL1, PNL2 are configured such that glass substrates SUB1, SUB2 on which the pixel electrodes 12, the thin film transistors 10 and the like are formed, and a glass substrate (not shown in the drawing) on which color filter and the like are formed, are overlapped relative to each other with a given gap therebetween. Both substrates are laminated to each other using a sealing material formed in a frame shape in the vicinity of peripheral portions between both substrates, and further, liquid crystal is filled and sealed in the inside of the space defined by the sealing material, which is disposed between both substrates, through a liquid crystal sealing opening formed in a portion of the sealing material. Further, polarizers are laminated to the outside of both substrates.

Here, since the present invention is not relevant to the inner structure of the liquid crystal display panel, a detailed explanation of the inner structure of the liquid crystal display panel is omitted. Further, the present invention is applicable to a liquid crystal display panel having any structure.

In this embodiment, a first drive circuit DRV1 is mounted on the glass substrate SUB1 of the first liquid crystal display panel PNL1.

The first drive circuit DRV1 includes a controller CNTL, a source driver SD which drives the video lines SL of the first and second liquid crystal display panels PNL1, PNL2, a gate driver GD which drives the scanning lines GL of the first and second liquid crystal display panels PNL1, PNL2, a power source circuit PC which supplies a first common voltage Vcom1 to a common electrode (also referred to as a counter electrode) 15 of the first liquid crystal display panel PNL1 and a second common voltage Vcom2 to a common electrode (also referred to as a counter electrode) 15 of the second liquid crystal display panel PNL2 and the like.

To the controller CNTL, display data and display control signals are inputted from a central processing unit (Microcomputer Unit, hereinafter referred to as a MPU) on a main body side.

Here, FIG. 1 shows a case in which the first drive circuit DRV1 is constituted of one semiconductor chip.

Figure 2:
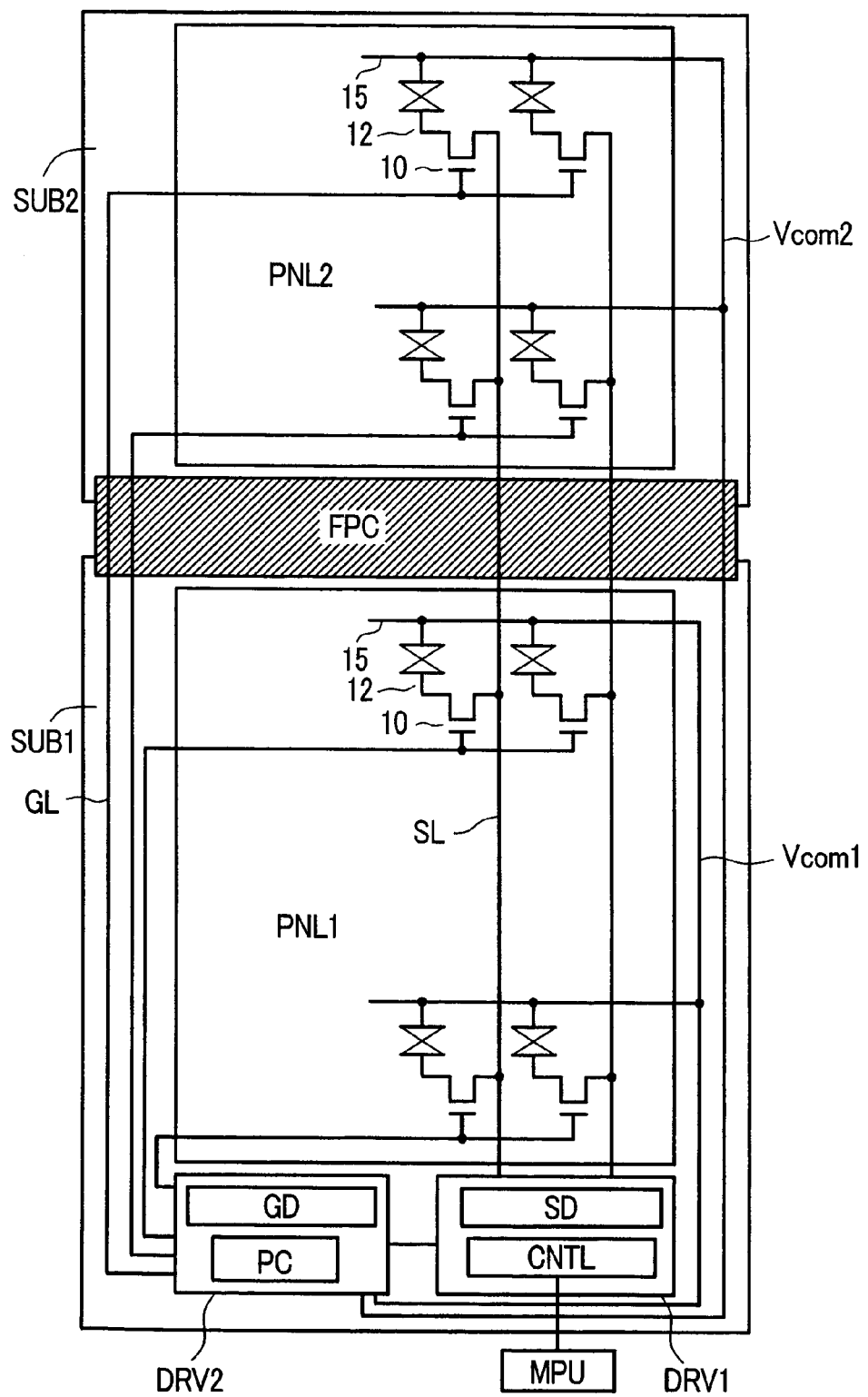
FIG. 2 is a schematic diagram showing the constitution of a liquid crystal display module representing a modification of the embodiment 1 of the present invention.

FIG. 2 is a block diagram showing the schematic constitution of a modification of a liquid crystal display module of this embodiment. The liquid crystal display module shown in FIG. 2 is characterized by dividing the drive circuit into two circuits, that is, a first drive circuit DRV1 and a second drive circuit DRV2.

In FIG. 2, the first drive circuit DRV1 includes a controller CNTL and a source driver SD which drives the video lines SL of the first and second liquid crystal display panels PNL1, PNL2; while, the second drive circuit DRV2 includes the gate driver GD which drives the scanning lines GL of the first and second liquid crystal display panels PNL1, PNL2 and a power source circuit PC which supplies the first common voltage Vcom1 to the common electrode 15 of the first liquid crystal display panel PNL1 and the second common voltage Vcom2 to the common electrode 15 of the second liquid crystal display panel PNL2. Further, the first drive circuit DRV1 and the second drive circuit DRV2 are respectively constituted of one semiconductor chip.

In the embodiment of FIG. 1, terminals (not shown in the drawing) are formed on the first liquid crystal display panel PNL1 and the second liquid crystal display panel PNL2 and these terminals are connected with a flexible printed wiring board FPC, whereby the second liquid crystal display panel PNL2 is connected with the first liquid crystal display panel PNL1 by way of the flexible printed wiring board FPC.

On the flexible printed wiring board FPC, connection lines for video lines, connection lines for scanning lines, connection lines for control signals, and connection lines for common electrodes are formed. That is, the video lines SL of the second liquid crystal display panel PNL2 are connected with the first drive circuit DRV1 via the connection lines for video lines on the flexible printed wiring board FPC and the video lines SL on the first liquid crystal display panel PNL1.

Further, the scanning lines GL of the second liquid crystal display panel PNL2 are connected with the first drive circuit DRV1 via the connection lines for scanning lines on the flexible printed wiring board FPC and the lines on the glass substrate SUB1 of the first liquid crystal display panel PNL1.

Further, the common electrode 15 of the second liquid crystal display panel PNL2 is connected with the first drive circuit DRV1 via the connection lines for common electrode on the flexible printed wiring board FPC and the lines on the glass substrate SUB1 of the first liquid crystal display panel PNL1.

Figure 3:
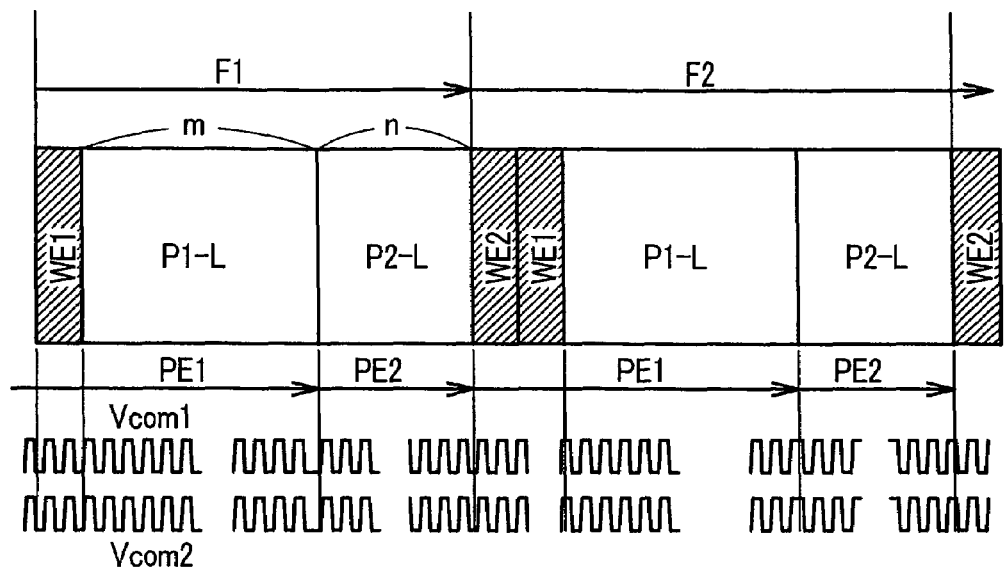
FIG. 3 is a diagram showing an AC driving method of a conventional liquid crystal display module.

In driving the first liquid crystal display panel PNL1 and the second liquid crystal display panel PNL2, which possess the video lines in common, as shown in FIG. 1 and FIG. 2, conventionally, as shown in FIG. 3, the first liquid crystal display panel PNL1 and the second liquid crystal display panel PNL2 are driven as a pseudo single screen having (m+n) lines. Accordingly, it is impossible to change the AC diving method between the first liquid crystal display panel PNL1 and the second liquid crystal display panel PNL2. However, to realize a reduction of the power consumption, it is desirable to be able to select those AC driving methods which are optimum for the respective liquid crystal display panels.

Here, in FIG. 3, "m" indicates the number of display lines in the first liquid crystal display panel PNL1, "n" indicates the number of display lines in the second liquid crystal display panel PNL2, F1 indicates a first frame, F2 indicates a second frame, PE1 indicates a display period of the first liquid crystal display panel PNL1, PE2 indicates a display period of the second liquid crystal display panel PNL2, and WE1 and WE2 indicate wait periods.

Still further, FIG. 3 shows a case in which both the first liquid crystal display panel PNL1 and the second liquid crystal display panel PNL2 adopt a one line common inversion method as the AC driving method.

Figure 4:
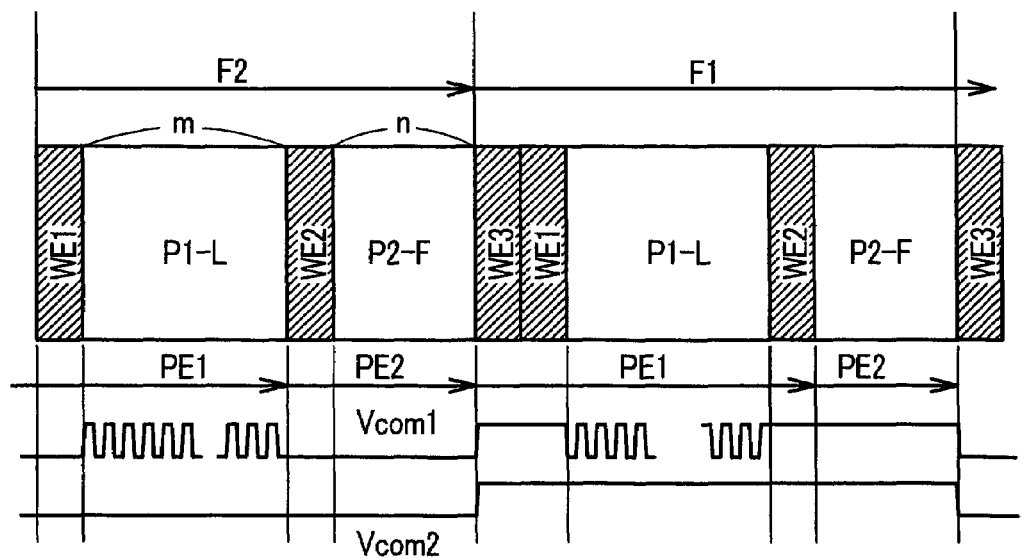
FIG. 4 is a diagram showing one example of the AC driving method of the liquid crystal display module of the embodiment 1 of the present invention.

In view of the above-described circumstances, this embodiment is configured such that the AC driving method can be freely set during the display period of the first liquid crystal display panel PNL1 and during the display period of the second liquid crystal display panel PNL2 which are present within the same frame. For example, as shown in FIG. 4, the first liquid crystal display panel PNL1 is driven using the one line common inversion method and the second liquid crystal display panel PNL2 is driven using the one frame common inversion method.

The drive circuit which drives the first and second liquid crystal display panels PNL1, PNL2 is constituted of the power source circuit PC which generates a common potential Vcom and the like that is applied to the common electrode 15, the gate driver GD which drives the scanning lines GL, the source driver SD which outputs the gray scale voltages, the controller CNTL and the like.

Here, the controller CNTL is connected with the MPU. The controller CNTL sets the drive conditions (AC driving method) of the first and second liquid crystal display panels PNL1, PNL2 using the MPU, and it also writes and holds the setting of the driving condition in a register RST in (FIG. 6 and FIG. 7) which is incorporated in the inside of the controller CNTL from the MPU and changes the AC driving methods for the first liquid crystal display panel PNL1 and the second liquid crystal display panel PNL2, respectively.

When the drive circuit is constituted of one semiconductor chip, as shown in FIG. 1, these drive circuits are all incorporated in the first drive circuit DRV1.

To perform driving while changing the AC driving methods for the first liquid crystal display panel PNL1 and the second liquid crystal display panel PNL2, respectively, it is necessary to set the display period of the first liquid crystal display panel PNL1 and the display period of the second liquid crystal display panel PNL2.

Accordingly, information indicating the numbers of display lines and the respective wait periods of the respective liquid crystal display panels is transmitted as an instruction signal to the controller CNTL from the MPU and set in the register which is incorporated in the inside of the controller CNTL. Further, by transmitting an instruction signal to the controller CNTL from the MPU, the AC driving methods of the respective liquid crystal display panels are also set in the register which is incorporated in the inside of the controller CNTL.

Due to such setting, by controlling the power source circuit PC and the source driver SD in the display period of the first liquid crystal display panel PNL1 and the display period of the second liquid crystal display panel PNL2, it is possible to perform driving which can be freely set according to respective AC driving methods during the display period of the first liquid crystal display panel PNL1 and the display period of the second liquid crystal display panel PNL2, which are present within the same frame.

FIG. 5 shows an example of such instruction signals. The instruction signals shown in FIG. 5 indicate serial data formed of 16 bits. In FIG. 5, the signals of 16, bits which are arranged laterally, are transferred to the first drive circuit DRV1 from the outside as instruction signals and are preserved in the register.

With respect to the instruction signals shown in FIG. 5, 3 bits ranging from D15 to D13 are allocated to index codes ID and have contents different from the other instruction signals. Further, using 13 bits ranging from D12 to D0, the numbers of display lines and the respective wait periods of the respective liquid crystal display panels are set.

When the drive circuit is divided in two, as in the case of the two semiconductor chips shown in FIG. 2, the power source circuit PC, which generates the common voltage Vcom that is applied to the common electrode 15, is incorporated in the second drive circuit DRV2 which does not include the controller CNTL; and, hence, it is necessary to allow the second drive circuit DRV2 to recognize the display period of the first liquid crystal display panel PNL1 and the display period of the second liquid crystal display panel PNL2.

Accordingly, as shown in FIG. 6, the instruction signal INST which is transmitted to the controller CNTL in the inside of the second drive circuit DRV2 from the MPU is transferred to the register RST in the inside of the second drive circuit DRV2.

Due to such a constitution, the display period of the first liquid crystal display panel PNL1 and the display period of the second liquid crystal display panel PNL2 are also set in the second drive circuit DRV2; and, at the same time, in the second drive circuit DRV2, a clock signal CL1 from the controller CNTL in the inside of the first drive circuit DRV1 is counted by a counter CNT. Hence, the display period of the first liquid crystal display panel PNL1 and the display period of the second liquid crystal display panel PNL2 are recognized.

Further, in the power source circuit PC in the inside of the second drive circuit DRV2, the alternating of the first common voltage Vcom1; which is applied to the common electrode 15 of the first liquid crystal display panel PNL1; and the second common voltage Vcom2, which is applied to the common electrode 15 of the second liquid crystal display panel PNL2 is performed in synchronism with alternating signals M1, M2 which are outputted from the controller CNTL in the inside of the first drive circuit DRV1. Hence, even in the case of the two semiconductor chip constitution, it is possible to perform driving which freely sets the AC driving methods during the display period of the first liquid crystal display panel PNL1 and the display period of the second liquid crystal display panel PNL2, which are present within the same frame.

When the drive circuit is divided in two, as in the case of the two semiconductor chips shown in FIG. 2, as another method which realizes a recognition of the display period of the liquid crystal display panel PNL1 and the display period of the second liquid crystal display panel PNL2, there is a method which transfers a screen recognition signal DR in FIG. 7 to the second drive circuit DRV2 from the controller CNTL in the inside of the first drive circuit DRV1. As shown in FIG. 7, a signal line which transfers the screen recognition signal DR is provided between the first drive circuit DRV1 and the second drive circuit DRV2, and the display period of the first liquid crystal display panel PNL1 is set when the screen recognition signal DR assumes a High level (hereinafter referred to as a H level); and, the display period of the second liquid crystal display panel PNL2 is set when the screen recognition signal DR assumes a Low level (hereinafter referred to as a L level), whereby it is possible to allow the second drive circuit DRV2 to recognize the display period of the first liquid crystal display panel PNL1 and the display period of the second liquid crystal display panel PNL2.

In the power source circuit PC of the second drive circuit DRV2, during the display period of the first liquid crystal display panel PNL1, only the first common voltage Vcom1 which is applied to the common electrode 15 of the first liquid crystal display panel PNL1 is alternated in synchronism with the alternating signal M, which is outputted from the controller CNTL in the inside of the first drive circuit DRV1; while, during the display period of the second liquid crystal display panel PNL2, only the second common voltage Vcom2 which is applied to the common electrode 15 of the second liquid crystal display panel PNL2 is alternated in synchronism with the alternating signal M. Hence, even in the case of the two chip constitution, it is possible to perform driving which can freely set the AC driving methods respectively during the display period of the first liquid crystal display panel PNL1 and during the display period of the second liquid crystal display panel PNL2, which are present within the same frame.

Accordingly, in this embodiment, it is possible to freely set the driving methods AC driving methods of two liquid crystal display panels consisting of the first and second liquid crystal display panels PNL1, PNL2, and, hence, a reduction of the power consumption can be realized when the two liquid crystal display panels, that is, the first and second liquid crystal display panels PNL1, PNL2, are simultaneously turned on.

Embodiment 2

In the liquid crystal display module of the present invention, to prevent the deterioration of liquid crystal caused by the application of a direct current to the liquid crystal, it is necessary to perform an AC driving which periodically inverts the polarity of the voltage applied to the liquid crystal.

When the common inversion method is adopted as such an AC driving method, it is also necessary to alternate the common voltage Vcom, which is applied to the common electrode 15, that is, to periodically invert the common voltage Vcom on a positive potential side and a lower potential side.

Further, when the liquid crystal display module includes two liquid crystal display panels PNL1, PNL2, as in the case of the above-mentioned embodiment 1, the required voltage values are different for the respective liquid crystal display panels, and, hence, it is necessary to prepare two common voltages consisting of first common voltage Vcom1 and a second common voltage Vcom2.

However, during the display period of the first liquid crystal display panel PNL1, it is unnecessary to perform the alternating of the second common voltage Vcom2, which is applied to the common electrode 15 of the second liquid crystal display panel PNL2, while during the display period of the second liquid crystal display panel PNL2, it is unnecessary to perform the alternating of the first common voltage Vcom1, which is applied to the common electrode 15 of the first liquid crystal display panel PNL1.

Accordingly, the alternating of the first common voltage Vcom1 and the alternating of the second common voltage Vcom2 are performed only during the display periods of the respective liquid crystal display panels. Accordingly, compared with a case in which both the first liquid crystal display panel PNL1 and the second liquid crystal display panel PNL2 are subjected to common inversion driving, it is possible to reduce the power consumption which is generated by an extra charge/discharge of the liquid crystal display panel, and, hence, a low power consumption can be realized.

Further, during the non-display period in each liquid crystal display panel the display period of the second liquid crystal display panel PNL2 with respect to the first liquid crystal display panel PNL1, the display period of the first liquid crystal display panel PNL1 with respect to the second liquid crystal display panel PNL2, irrespective of the AC driving method, the alternating of the common voltage is not performed. Hence, the common voltage which is applied to the common electrode 15 of the liquid crystal display panel during the non-display period is held using only the holding capacitance without using an output of the amplifier, whereby it is possible to perform the alternating of the common voltage which is applied to the common electrodes 15 of the first liquid crystal display panel PNL1 and the second liquid crystal display panel PNL2 using only one amplifier which outputs the common voltage.

Figure 8A:
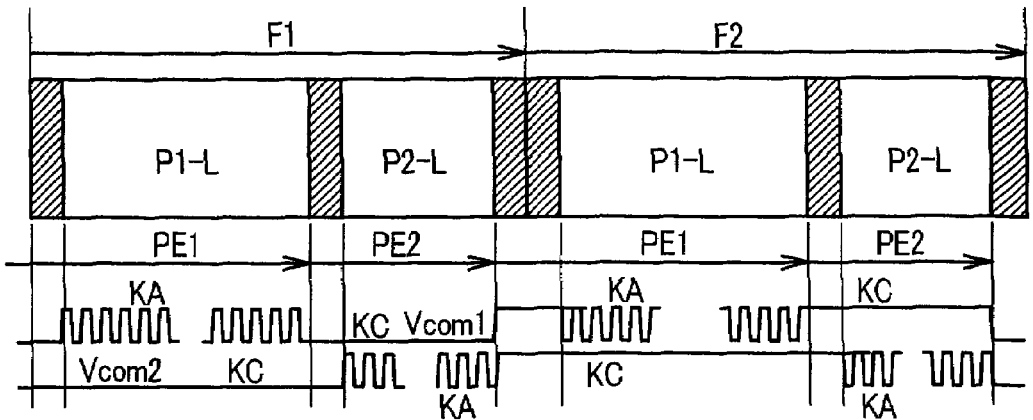
FIG. 8A is a diagram showing one example of an AC driving method of a liquid crystal display module representing an embodiment 2 of the present invention.

FIG. 8A shows voltage waveforms of the common voltages when the common voltages which are applied to the common electrodes 15 of the first liquid crystal display panel PNL1 and the second liquid crystal display panel PNL2 are alternated in this embodiment. More particularly, FIG. 8A shows the case in which the common voltages which are applied to the common electrodes 15 of the first liquid crystal display panel PNL1 and the second liquid crystal display panel PNL2 are inverted for every one line.

Further, in FIG. 8A, symbol F1 indicates a first frame, symbol F2 indicates a second frame, symbol PE1 indicates a display period of the first liquid crystal display panel PNL1, symbol PE2 indicates a display period of the second liquid crystal display panel PNL2, symbol P1-L indicates a one line inverting period of the common voltage Vcom1 of the first liquid crystal display panel PNL1, symbol P2-L indicates a one line inverting period of the common voltage Vcom2 of the second liquid crystal display panel PNL2, symbol KA indicates periods during which the common voltages are supplied from the amplifier, and symbol KC indicates periods during which the common voltages are held by the holding capacitances.

Figure 8B:
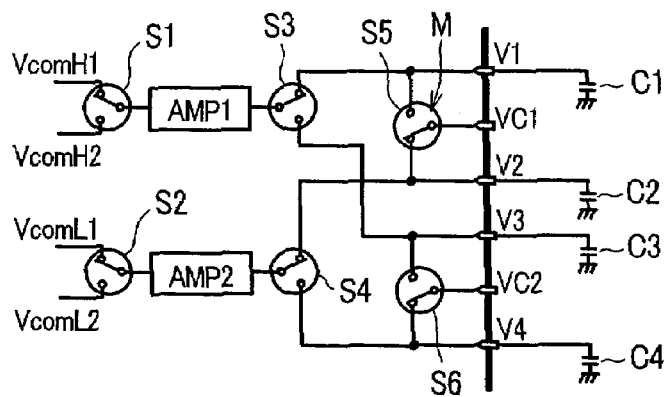
FIG. 8B and FIG. 8C are schematic circuit diagrams of circuits used to implement the method.
Figure 8C:
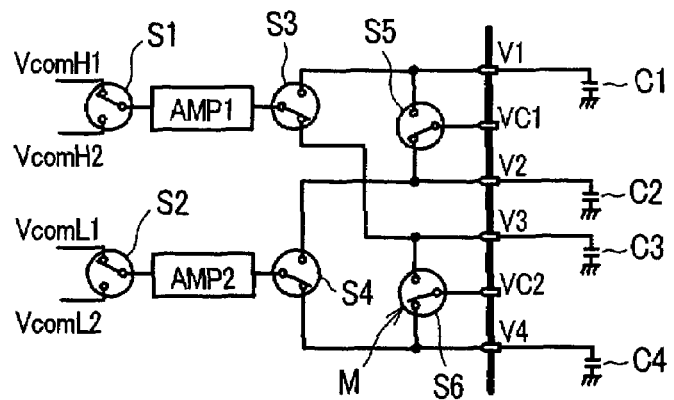

FIG. 8B and FIG. 8C show the circuit constitutions for realizing the driving method shown in FIG. 8A. FIG. 8B indicates a circuit operation during the display period of the first liquid crystal display panel PNL1, and FIG. 8C indicates a circuit operation during the display period of the second liquid crystal display panel PNL2.

As shown in FIGS. 8B and 8C, to a first amplifying circuit AMP1, a first common voltage VcomH1 on a high potential side and a second common voltage VcomH2 on a high potential side are selectively inputted via a switching element S1. To a second amplifying circuit AMP2, a first common voltage VcomL1 on a low potential side and a second common voltage VcomL2 on a low potential side are selectively inputted via a switching element S2. An output of the first amplifying circuit AMP1 is outputted to a terminal V1 or a terminal V3 via a switching element S3. A first holding capacitance C1 is connected to the terminal V1 and a third holding capacitance C3 is connected to the terminal V3.

An output of the second amplifying circuit AMP2 is outputted to a terminal V2 or a terminal V4 via a switching element S4. A second holding capacitance C2 is connected to the terminal V2 and a fourth holding capacitance C4 is connected to the terminal V4. A voltage of the terminal V1 or the terminal V2 is outputted to a terminal VC1 via a switching element S5, and a voltage outputted from the terminal VC1 is applied to the common electrode 15 of the first liquid crystal display panel PNL1.

A voltage of the terminal V3 or the terminal V4 is outputted to a terminal VC2 via a switching element S6, and a voltage outputted from the terminal VC2 is applied to the common electrode 15 of the second liquid crystal display panel PNL2.

Hereinafter, the circuit operation during the display period of the first liquid crystal display panel PNL1 will be explained in conjunction with FIG. 8B. During this period, the switching element S1 selects the first common voltage VcomH1 on a high potential side, and, hence, the first common voltage VcomH1 on a high potential side is inputted to the first amplifying circuit AMP1. The switching element S2 selects the first common voltage VcomL1 on a low potential side, and, hence, the first common voltage VcomL1 on a low potential side is inputted to the second amplifying circuit AMP2.

The switching element S3 selects the terminal V1 side, and, hence, the output of the first amplifying circuit AMP1 is outputted to the terminal V1. In the same manner, the switching element S4 selects the terminal V2 side, and, hence, the output of the second amplifying circuit AMP2 is outputted to the terminal V2.

The switching element S5 selects the voltage of the terminal V1 or the terminal V2 in synchronism with the alternating signal M, and, hence, the first common voltage VcomH1 on a high potential side and the first common voltage VcomL1 on a low potential side are alternately outputted from the terminal VC1 for every one line and are applied to the common electrode 15 of the first liquid crystal display panel PNL1.

At this point of time, the switching element S6 is stopped, and, hence, the voltage which is held in the holding capacitance C3 or the holding capacitance C4 is outputted from the terminal VC2 and is applied to the common electrode 15 of the second liquid crystal display panel PNL2.

Here, FIG. 8B shows a case in which the voltage held by the holding capacitance C4 is outputted from the terminal VC2.

Hereinafter, the circuit operation during the display period of the second liquid crystal display panel PNL2 will be explained in conjunction with FIG. 8C. During this period, the switching element S1 selects the second common voltage VcomH2 on a high potential side, and, hence, the second common voltage VcomH2 on a high potential side is inputted to the first amplifying circuit AMP1. The switching element S2 selects the second common voltage VcomL2 on a low potential side, and, hence, the second common voltage VcomL2 on a low potential side is inputted to the second amplifying circuit AMP2.

The switching element S3 selects the terminal V3 side, and, hence, the output of the first amplifying circuit AMP1 is outputted to the terminal V3. In the same manner, the switching element S4 selects the terminal V4 side and hence, the output of the second amplifying circuit AMP2 is outputted to the terminal V4.

The switching element S6 selects the voltage of the terminal V2 or the terminal V4 in synchronism with the alternating signal M, and, hence, the second common voltage VcomH2 on a high potential side and the second common voltage VcomL2 on a low potential side are alternately outputted from the terminal VC2 for every one line and are applied to the common electrode 15 of the second liquid crystal display panel PNL2.

At this point of time, the switching element S5 is stopped, and, hence, the voltage which is held in the holding capacitance C1 or the holding capacitance C2 is outputted from the terminal VC1 and is applied to the common electrode 15 of the first liquid crystal display panel PNL1.

Here, FIG. 8C shows a case in which the voltage held by the holding capacitance C2 is outputted from the terminal VC1.

Figure 9A:
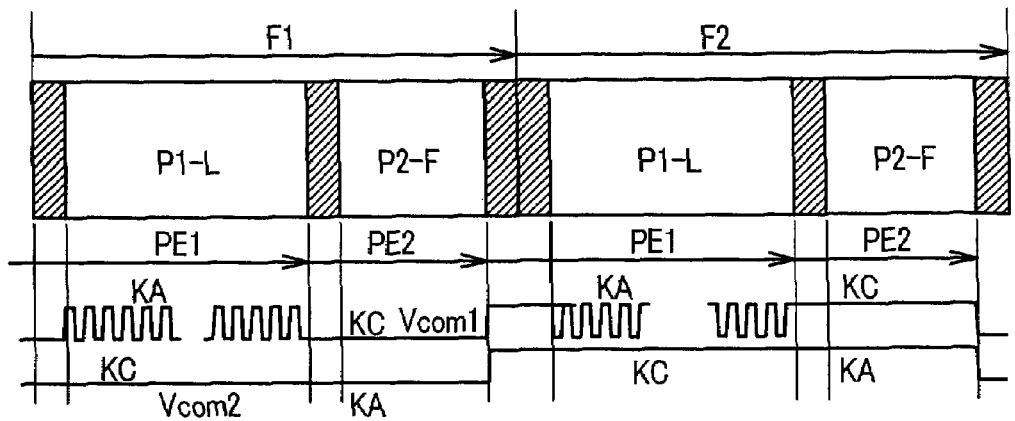
FIG. 9A is a diagram showing another example of the AC driving method of the liquid crystal display module of the embodiment 2 of the present invention.
Figure 9B:
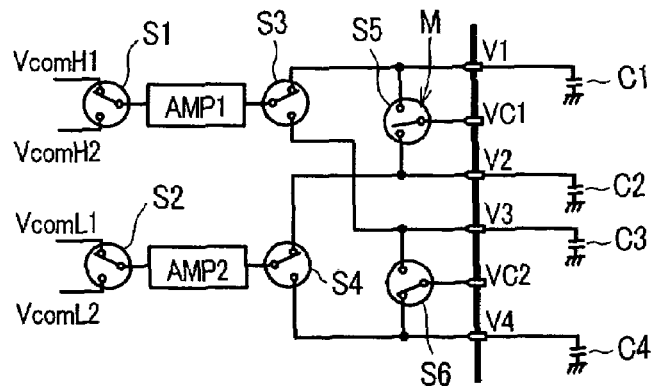
FIG. 9B and FIG. 9C are schematic circuit diagrams of circuits used to implement the method.
Figure 9C:
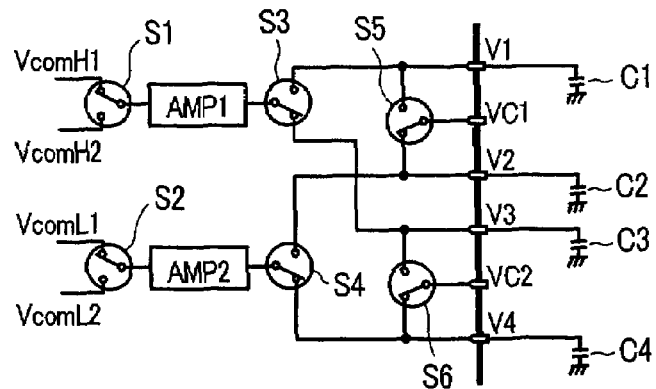

FIG. 9A shows voltage waveforms of the common electrodes when this embodiment adopts the one line common inversion method in which the common voltage applied to the common electrode 15 of the first liquid crystal display panel PNL1 for every one line and the one frame common inversion method in which the common voltage applied to the common electrode 15 of the second liquid crystal display panel PNL2 is inverted for every one frame. FIG. 9B shows a circuit operation during the display period of the first liquid crystal display panel PNL1 in the driving method shown in FIG. 9A, while FIG. 9C shows a circuit operation during the display period of the second liquid crystal display panel PNL2 in the driving method shown in FIG. 9A.

Figure 10A:
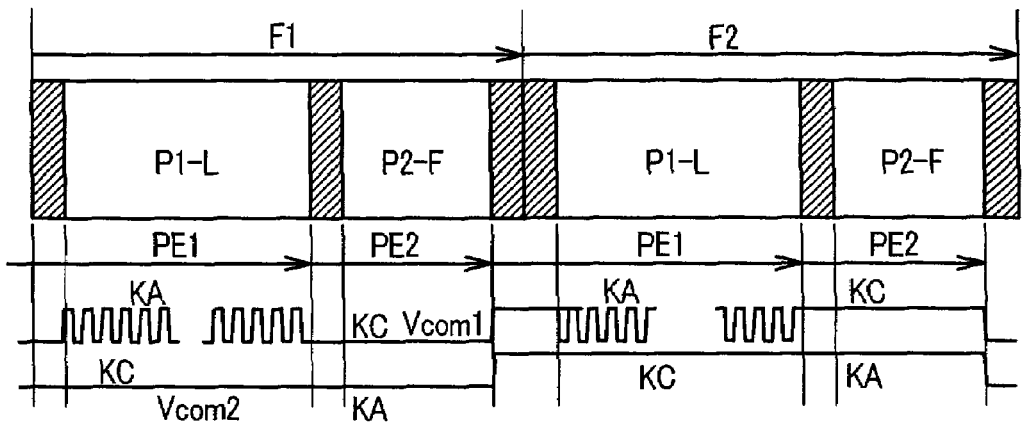
FIG. 10A is a diagram showing another example of the AC driving method of the liquid crystal display module of the embodiment 2 of the present invention.
Figure 10B:
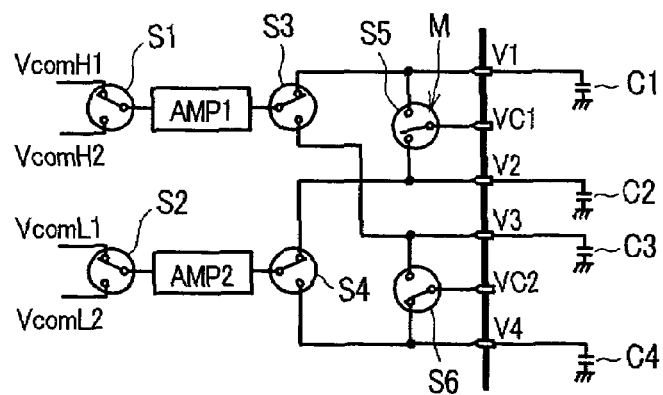
FIGS. 10B and FIG. 10C are schematic circuit diagrams of circuits used to implement the method.
Figure 10C:
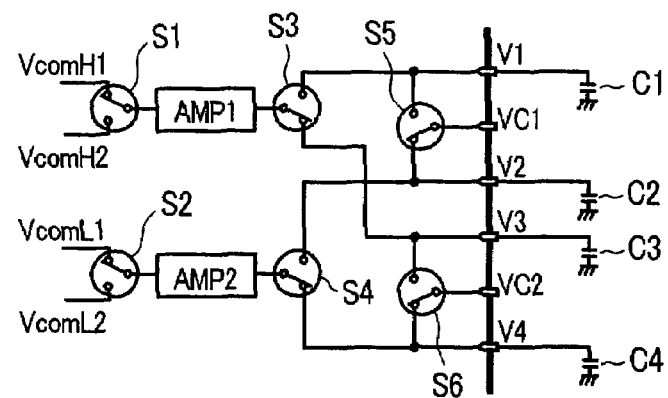

In the same manner, FIG. 10A shows the voltage waveforms of the common electrodes when the embodiment adopts the one line common inversion method in which the common voltage applied to the common electrode 15 of the first liquid crystal display panel PNL1 is inverted for every one line and allows the second liquid crystal display panel PNL2 to assume a non-display setting. FIG. 10B shows a circuit operation during the display period of the first liquid crystal display panel PNL1 in the driving method shown in FIG. 10A, while FIG. 10C shows a circuit operation during the display period of the second liquid crystal display panel PNL2 in the driving method shown in FIG. 10A.

Here, in FIG. 9A and FIG. 10A, symbol P2-F indicates one frame inverting period of the common voltage Vcom2 of the second liquid crystal display panel PNL2. Further, since the circuit operations shown in FIGS. 9B, 9C and FIGS. 10B, 10C are substantially equal to the circuit operation shown in FIGS. 8B, 8C, a repeated explanation thereof is omitted.

In this embodiment, since the power consumption which is caused by the extra charge/discharge of the liquid crystal display panel can be reduced, a low power consumption can be realized. Further, as the amplifying circuits which output the first common voltage VcomH1 on a high potential side, and the second common voltage VcomH2 on a high potential side as well as the first common voltage VcomL1 on a low potential side and the second common voltage VcomL2 on a low potential side, it is sufficient to provide one amplifying circuit for each common voltage, and, hence, the amplifying circuits can be reduced, whereby a low power consumption can be realized.

Embodiment 3

Figure 11:
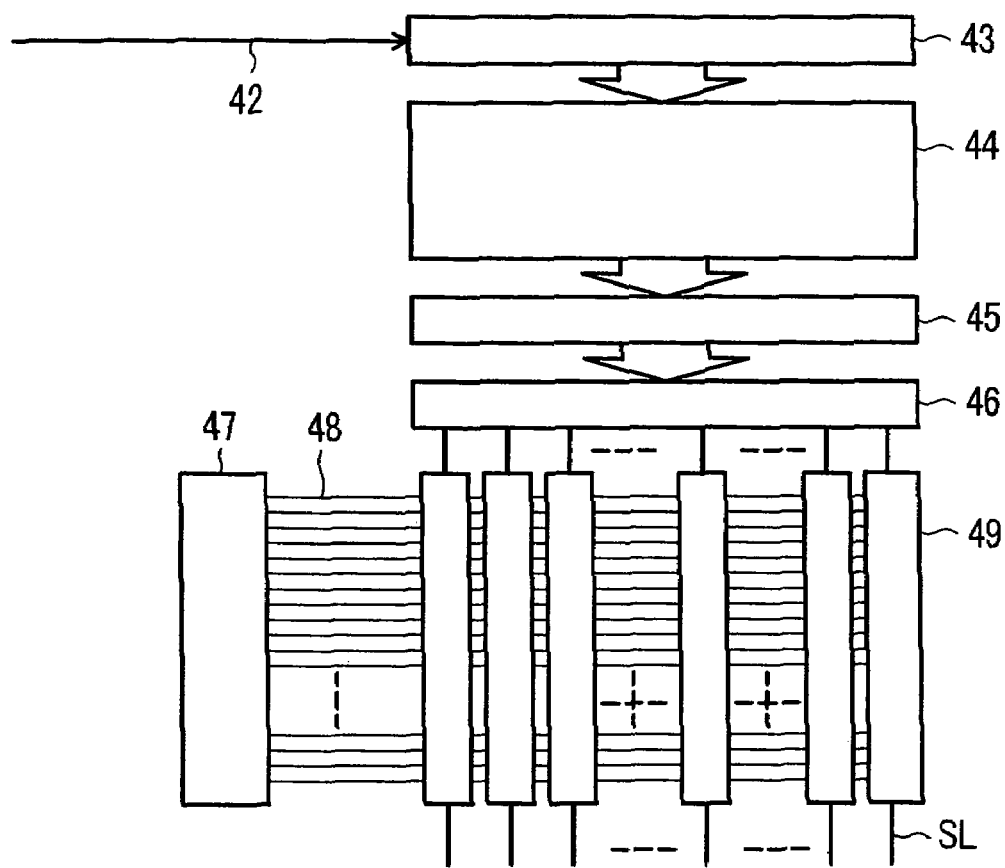
FIG. 11 is a block diagram showing the constitution of one example of a source driver SD of the liquid crystal display module of the embodiment 1 of the present invention.

FIG. 11 is a block diagram showing the constitution of one example of the source driver SD of the liquid crystal display module of the above-mentioned embodiment 1.

The display data 42 is fetched in a memory writing circuit 43 and, thereafter, is written in a given address of a frame memory 44. Next, the display data stored in the frame memory 44 is read out by a memory reading circuit 45 in response to drive timing of the liquid crystal display panel and is temporarily held in a data latch circuit 46 as display data corresponding to one line.

On the other hand, a gray scale voltage generating circuit 47 generates a plurality of gray scale voltages 48 which are necessary for a gray scale display and generates 64 gray scale voltages 48, for example.

Next, selectors (also called recorders) 49 respectively select one gray scale voltage in response to the display data held in the data latch circuit 46 out of the 64 gray scale voltages 48, and they output the gray scale voltage to the video lines SL.

In the liquid crystal display module shown in FIG. 1 and FIG. 2 which has two liquid crystal display panels PNL1, PNL2 having the video lines in common, when a display is produced on only one liquid crystal display panel, to drive the liquid crystal display panel which performs the display operation, the gray scale voltage is applied to the video lines.

Here, due to the parasitic capacitance between the source and drain of the thin film transistor 10, the voltage is applied to the liquid crystal display panel which is set in a non-display state, and, hence, it is impossible to completely stop the driving of the liquid crystal display panel that is set in a non-display state. Accordingly, it is necessary to produce a black or white display with respect to all pixels of the liquid crystal display panel that is set in a non-display state.

Figure 12:
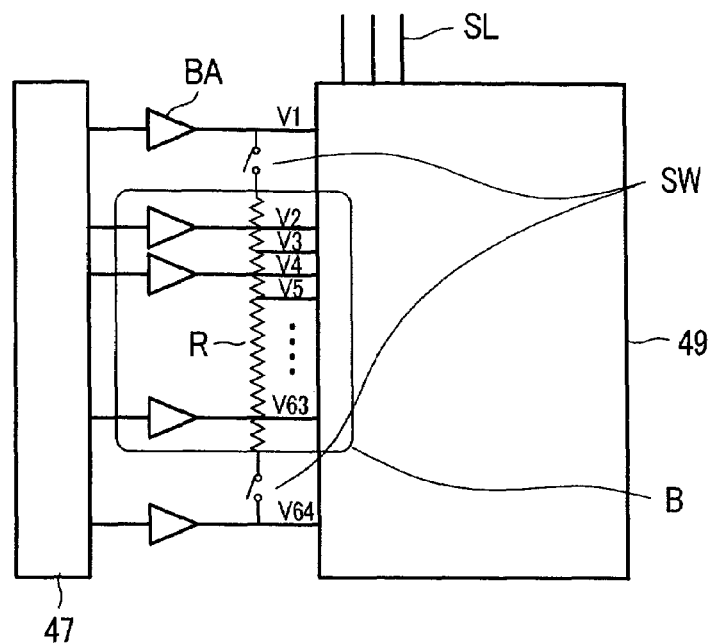
FIG. 12 is a block diagram showing one example of the constitution of a gray scale voltage generating circuit and a selector in a liquid crystal display module representing an embodiment 3 of the present invention.
Figure 13:
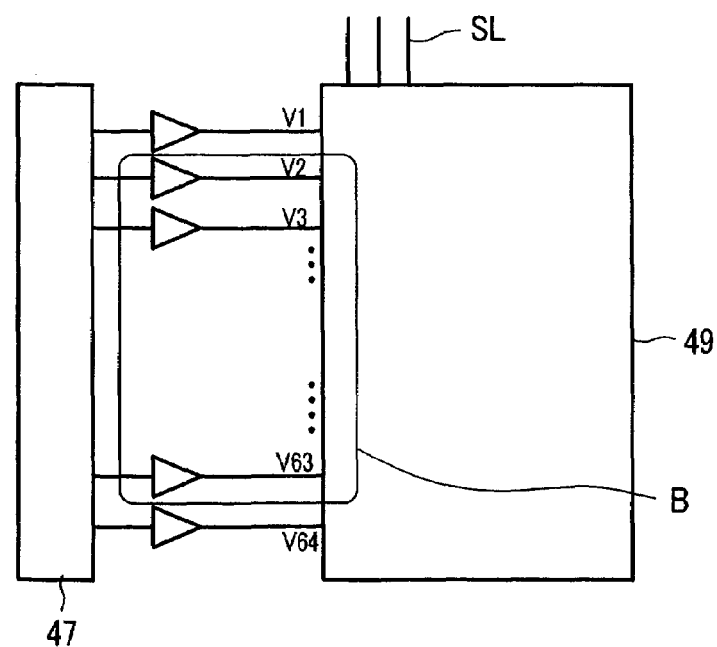
FIG. 13 is a block diagram showing another example of the constitution of the gray scale voltage generating circuit and the selector in a liquid crystal display module of the embodiment 3 of the present invention.

Here, in producing only a black or white display, only two upper and lower values are necessary as the gray scale voltages to be outputted to the video lines from the source driver SD, and, hence, as shown in FIG. 12 and FIG. 13, when the gray scale voltages that are outputted from the gray scale voltage generating circuit 47 are supplied to the selectors 49 via amplifying circuits (or buffer circuits) BA, it is possible to stop the amplifying circuits the amplifying circuits surrounded by a frame B in FIG. 12 and FIG. 13, other than the amplifying circuits for the gray scale voltage of V1 and the gray scale voltage of V64.

Further, as shown in FIG. 12, when a ladder resistance R is used, it is possible to separate the ladder resistance R using switching elements SWR.

In this manner, during the non-display period of the first liquid crystal display panel PNL1 or the second liquid crystal display panel PNL2, it is possible to realize a low power consumption at the time of performing the display operation of only one liquid crystal display panel by separating the amplifying circuit BA which performs the amplifying of the current of the gray scale voltages that are outputted from the gray scale voltage generating circuit 47 or the ladder resistance R.

To perform the above-mentioned operation, in a state in which the display periods of the first and the second liquid crystal display panels PNL1, PNL2 are set, the liquid crystal display panel which is set in the non-display state is set by the MPU using an instruction signal. Accordingly, due to such a provision, during the non-display period of the liquid crystal display panel which is set in a non-display state, the MPU performs a control to separate the amplifying circuit BA which performs the current amplification of the gray scale voltages that are outputted from the gray scale voltage generating circuit 47 or the ladder resistance R.

Accordingly, during the non-display period, the amplifying circuits BA which perform the current amplification of the gray scale voltages that are outputted from the gray scale voltage generating circuit 47 or the ladder resistance R are automatically stopped, and, hence, a low power consumption can be realized at the time of performing the display operation of only one liquid crystal display panel.

Embodiment 4

In driving two liquid crystal display panels PNL1, PNL2 having the video lines in common, as shown in FIG. 1 and FIG. 2, the power consumption differs depending on the driving method of the liquid crystal display panel. A booster circuit differs in boosting ability depending on the boosting clock frequency, the size of a drive MOS of a booster circuit and other factors, and, hence, the individual power consumption of the booster circuit differs depending on the boosting ability. Accordingly, in this embodiment, the drive setting of the booster circuit is established with respect to respective liquid crystal display panels, and the driving of the booster circuit is changed over with respect to the display periods of the respective liquid crystal display panels.

Figure 14A:
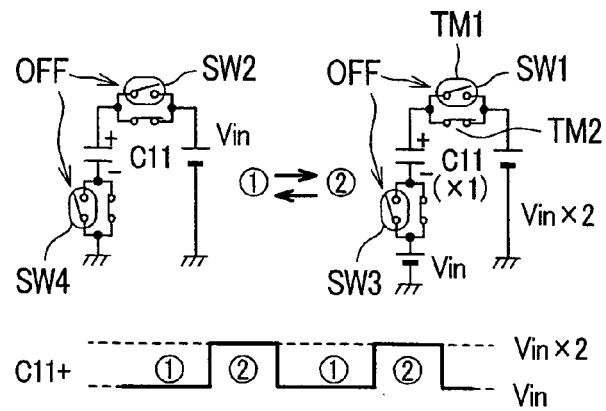
FIG. 14A is a schematic circuit diagram of a booster circuit of a liquid crystal display module representing an embodiment 4 of the present invention.
Figure 14B:
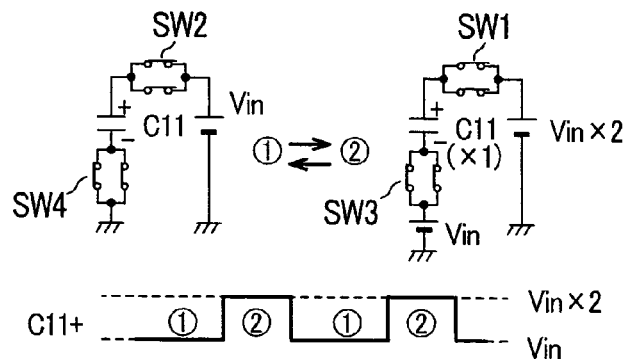
FIG. 14B is a schematic circuit diagram of a booster circuit of a liquid crystal display module representing an embodiment 4 of the present invention.
Figure 14C:
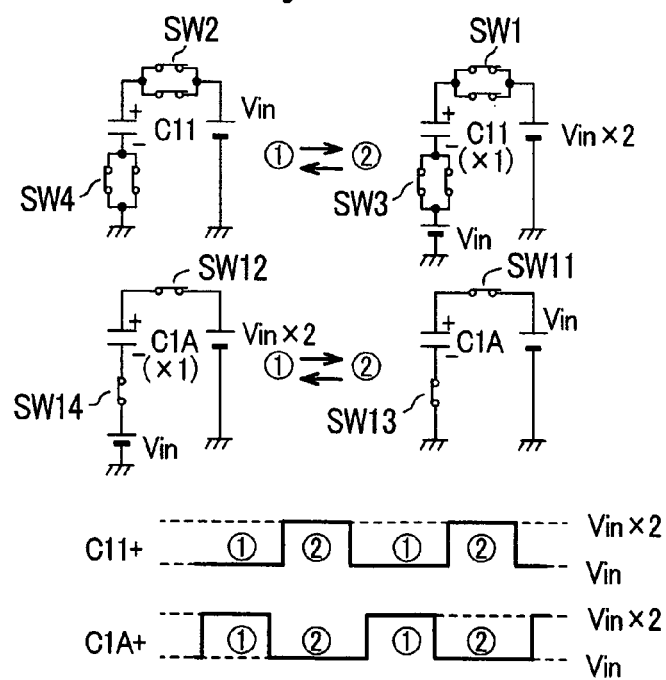
FIG. 14C is a schematic circuit diagram of the booster circuit of a liquid crystal display module of the embodiment 4 of the present invention.

FIG. 14A to FIG. 14C are views for explaining the booster circuits of this embodiment. Here, the booster circuits shown in FIG. 14A to FIG. 14C are booster circuits which double the input voltage Vin.

The booster circuits of this embodiment are characterized in that two MOS transistors TM1, TM2 are connected in parallel as a switching element SW1 to SW4.

Here, when a normal mode shown in FIG. 14B is used as a reference, in a low power mode shown in FIG. 14A, one MOS transistor TM1 which constitutes the switching element of the booster circuit is stopped so as to reduce the power consumption. Further, in a high power mode shown in FIG. 14C, it is possible to cope with a large load current by driving the two booster circuits shown in FIG. 14B in a complementary manner.

Here, in FIG. 14C, the gate width of one MOS transistor which constitutes the switching element SW11 to SW14 is equal to a value obtained by adding gate widths of two MOS transistors TM1, TM2 which constitute the switching element SW1 to SW4.

Accordingly, for example, when the first liquid crystal display panel PNL1 is driven using the one line common inversion method and the second liquid crystal display panel PNL2 is driven using the one frame common inversion method, during the display period of the first liquid crystal display panel PNL1, which exhibits a large current consumption, the booster circuit is driven in a high power mode, while during the display period of the second liquid crystal display panel PNL2, in which frame inversion is employed, which requires a relatively small power consumption, the booster circuit is driven in a normal mode.

In this manner, by performing a setting of the booster circuit in a suitable manner for the power consumption during the respective display periods of the first and second liquid crystal display panels PNL1, PNL2, during the respective display period of the first liquid crystal display panel PNL1 and display period of the second liquid crystal display panel PNL2 in one frame, the optimum booster circuit operation is performed, and, hence, a low power consumption of the liquid crystal display module can be realized.

Further, as another example, in performing the display operation of only one of the first liquid crystal display panel PNL1 and the second liquid crystal display panel PNL2, during the liquid crystal display panel display period in the non-display setting, the booster circuit is set to a low power mode and the cycle of the boosting clock is delayed, whereby a low power consumption can be realized.

FIG. 15 shows the more specific constitution of the booster circuit shown in FIGS. 14A to 14C.

To obtain the circuit shown in FIG. 14B, the switching element SW2 and the switching element SW4 shown in FIG. 15 are turned on. Accordingly, the voltage of the input power source Vin is charged in a booster capacitance C11.

Next, the switching element SW2 and the switching element SW4 shown in FIG. 15 are turned off, the switching element SW3 is turned on to apply the input power source Vin to a booster capacitance C11 and, at the same time, the switching element SW1 is turned on to charge a holding capacitance Cout. In this case, it is needless to say that each switching element SW1 is constituted of two MOS transistors which are connected in parallel.

In this manner, the voltage which is twice as high as the input power source Vin is held in the holding capacitance Cout.

As has been explained heretofore, according to the liquid crystal display modules of the above-mentioned respective embodiments, by adopting individual AC driving methods, it is possible to adopt optimum driving methods for the first liquid crystal display panel PNL1 and the second liquid crystal display panel PNL2, and, hence, a low power consumption can be realized.

Further, in producing a display on only the one-side liquid crystal display panel out of the first and second liquid crystal display panels PNL1, PNL2, by stopping operation of the unnecessary amplifiers during the display period of the liquid crystal display panel which is set in a non-display state, the power consumption can be reduced, and, hence, a low power consumption can be realized.

Further, by stopping the alternating of the common voltage Vcom during the period in which the display is unnecessary, the power which is necessary for charging/discharging of the liquid crystal display panel can be reduced, and, hence, the common voltages Vcom on a high potential side and on a low potential side can be generated using one amplifying circuit, whereby A low power consumption can be realized.

Still further, corresponding to the driving methods of the first liquid crystal display panel PNL1 and the second liquid crystal display panel PNL2, the driving of the booster circuit can be optimized during the display periods of the respective liquid crystal display panels, and, hence, A low power consumption can be realized.

Although the present invention has been specifically explained in conjunction with the above-mentioned embodiments, it is needless to say that the present invention is not limited to the above-mentioned embodiments and various modifications can be made without departing from the gist of the present invention.

What is claimed is:

1. A liquid crystal display device comprising:
   a first liquid crystal display panel;
   a second liquid crystal display panel;
   a drive circuit which is mounted on the first liquid crystal display panel;
   output terminals which are mounted on the first liquid crystal display panel and to which signals outputted from the drive circuit are supplied; and
   connection lines which connect the output terminals and the second liquid crystal display panel;
   wherein the drive circuit is capable of changing an AC driving method during a display period of the first liquid crystal display panel and an AC driving method during a display period of the second liquid crystal display panel which are present within a same frame;
   wherein the drive circuit outputs a first common voltage for the first liquid crystal display panel and a second common voltage for the second liquid crystal display panel;
   wherein the drive circuit stops the alternating of the first common voltage during a non-display period of the first liquid crystal display panel and stops the alternating of the second common voltage during a non-display period of the second liquid crystal display panel; and
   wherein the drive circuit includes
   a first amplifying circuit which selectively outputs a first common voltage on a high potential side for the first liquid crystal display panel or a second common voltage on a high potential side for the second liquid crystal display panel,
   a second amplifying circuit which selectively outputs a first common voltage on a low potential side for the first liquid crystal display panel or a second common voltage on a low potential side for the second liquid crystal display panel,
   a first capacitive element which holds the first common voltage on the high potential side,
   a second capacitive element which holds the first common voltage on the low potential side,
   a third capacitive element which holds the second common voltage on the potential side,
   a fourth capacitive element which holds the second common voltage on the low potential side,
   a first switching element which outputs the first common voltage on the high potential side immediately before the non-display period which is held by the first capacitive element or the first common voltage on the low potential side immediately before the non-display period which is held by the second capacitive element as the common voltage of the first liquid crystal display panel during the non-display period of the first liquid crystal display panel, and
   a second switching element which outputs the second common voltage on the high potential side immediately before the non-display period which is held by the third capacitive element or the second common voltage on the low potential side immediately before the non-display period which is held by the fourth capacitive element as the common voltage of the second liquid crystal display panel during the non-display period of the second liquid crystal display panel.

2. A liquid crystal display device according to claim 1, wherein the drive circuit includes a register, and
   the drive circuit determines the AC driving method of the first liquid crystal display panel and the AC driving method of the second liquid crystal display panel based on information inputted to the register from the outside.

3. A liquid crystal display device according to claim 2, wherein
   the drive circuit includes a first drive circuit and a second drive circuit,
   the first drive circuit and the second drive circuit respectively include the register, and the first drive circuit transfers information inputted to the register of the first drive circuit from the outside to the register of the second drive circuit.

4. A liquid crystal display device according to claim 3, wherein the first drive circuit transfers a screen recognition signal which allows the recognition of the display period of the first liquid crystal display panel and the display period of the second liquid crystal display panel to the second drive circuit.

5. A liquid crystal display device according to any one of claims 1 to 4, wherein the AC driving method of the first liquid crystal display panel is an n-line common inversion method, and the AC driving method of the second liquid crystal display panel is an n-frame common inversion method.

* * * * *